June 23, 1942.  F. N. ROSS  2,287,488
PULLEY
Filed April 22, 1939  2 Sheets-Sheet 1
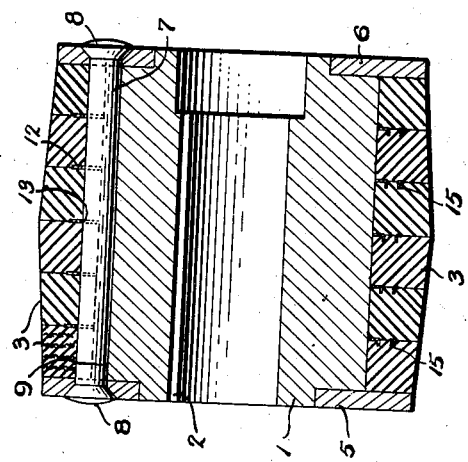
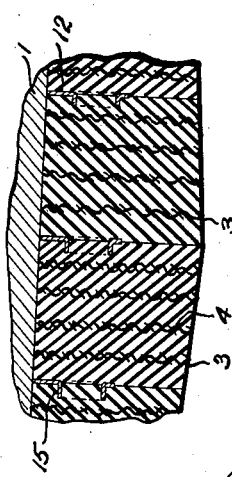
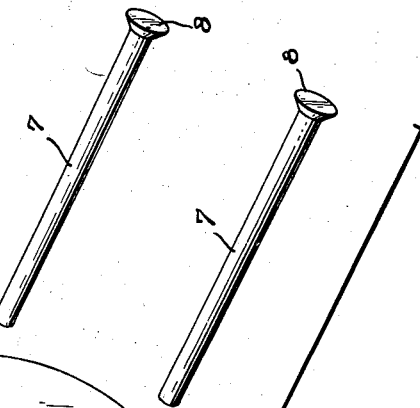
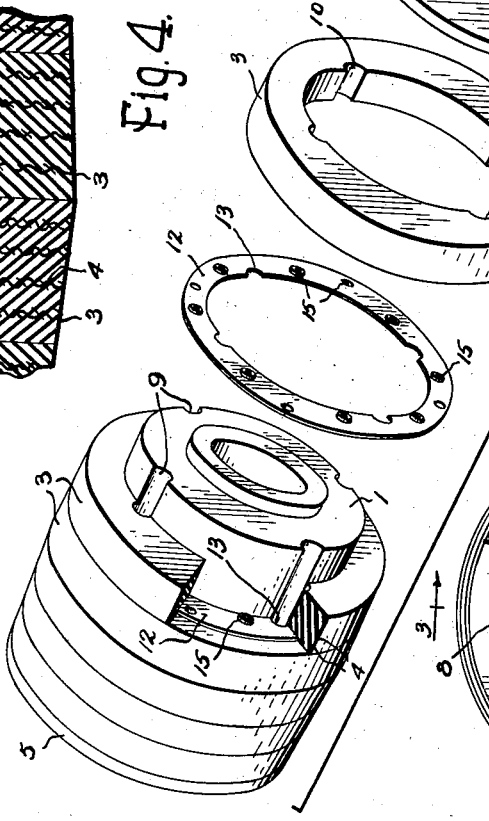
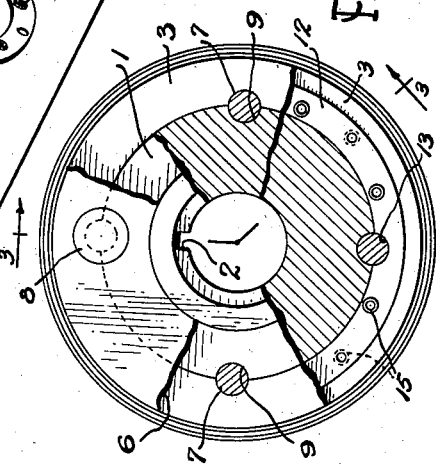
INVENTOR.
Frederick N. Ross
BY
Barnes, Kisselle, Laughlin & Raisch
ATTORNEYS June 23, 1942.   F. N. ROSS   2,287,488
PULLEY
Filed April 22, 1939   2 Sheets-Sheet 2

INVENTOR.
Frederick N. Ross
BY
Barnes, Kisselle, Laughlin & Raisch
ATTORNEYS

Patented June 23, 1942

2,287,488

UNITED STATES PATENT OFFICE 2,287,488

PULLEY

Frederick N. Ross, Grosse Pointe Park, Mich.

Application April 22, 1939, Serial No. 269,328

7 Claims. (Cl. 74—230.7)

This invention relates to a pulley of the type for accommodating a flat belt.

The general objects of the invention reside in the provision of a pulley which has improved characteristics of operation, increased life, increased efficiency, and one which results in a lower rate of wear on the belt and the lacings in the belt. More specifically, the pulley is one which has a high coefficient of friction with a belt, to the end that belt dressing or resin substance is not needed. The lacings of the belt move silently over the pulley and the lacings are not rapidly worn out. Due to the high coefficient of friction, a driving arrangement may be provided with a relatively short distance from center to center of the pulleys without the use of an idler pulley for wrapping a belt around one or both of the pulleys. The pulley itself has a longer life than pulleys made of laminated wood or pulleys made of paper or fibrous composition. In fact where a pulley of this kind is used a flat belt may be used for some installations where heretofore a plurality of V belts were necessary.

To these ends a pulley is provided which is preferably composed of a plurality of laminations with each lamination comprising rubber with cord or fabric embedded therein. The rubber is preferably a live rubber so that the pulley has some resiliency. Still further, the pulley provided is such that the several laminations are individually driven from the power shaft or, conversely, individually drive a driven shaft, and the several laminations are tied to a supporting hub structure so that the individual laminations do not spread away from the hub. The invention is carried out by structures as shown in the accompanying drawings.

Fig. 1 is a perspective view showing a number of parts of the pulley in separated form.

Fig. 2 is an end view of the pulley showing some of the parts in cross section.

Fig. 3 is a sectional view of the pulley taken substantially on line 3—3 of Fig. 2.

Fig. 4 is an enlarged cross sectional view illustrating the rubber and fabric structure of the laminations.

Figure 6:
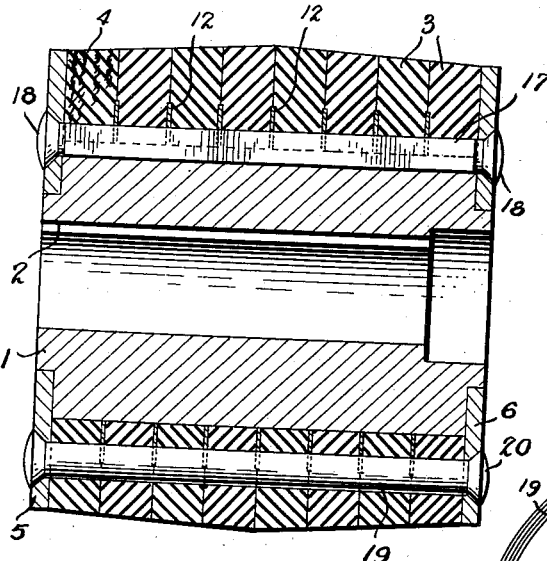
Fig. 6 is a cross sectional view taken substantially on line 6—6 of Fig. 5.

The form of pulley shown in the drawings comprises a metal hub 1 arranged to receive a shaft and to which it may be keyed, the hub having a key-way 2. Upon this hub is disposed a suitable number of laminations, each comprising a composition of rubber and fabric or cord. The term "fabric" is used herein henceforth and in the claims to broadly cover any fibrous substance in the rubber, whether the fabric, technically, be cord, woven fabric or a synthetic substance. Each lamination is indicated at 3 and, as shown in Fig. 4, each rubber layer has embedded therein a cord or fabric structure 4. One source of supply for the laminations is used casings of pneumatic tires for automotive vehicles. The rings or discs of material may be cut from the side wall of such used tires. Of course, the laminations may be obtained elsewhere, as for example, they may be manufactured for this particular purpose. A plurality of such laminations are placed over the hub as shown in Fig. 3 and may be held in place by end rings 5 and 6 held in place by rods 7, the ends of which may be riveted over as shown at 8. The hub is preferably grooved as at 9 to receive the rods, and the laminations 3 may be similarly grooved as shown at 10.

In order to establish a driving connection for each lamination, a metal ring 12 is disposed between each two laminations, the rings having notches 13 for receiving the tie rods, thus forming a drive connection for each ring. These rings have projections or lanced formations 15, preferably projecting to opposite sides thereof. This formation may be provided by merely striking out the metal, and this is termed "lancing" herein. The laminations are preferably pressed together with some pressure and held in this condition upon the riveting of the ends of the tie rods. The lanced rings transfer the driving action directly from the hub to the individual laminations, or vice versa, depending upon whether the pulley is on a driving or driven shaft. Moreover, when the pressure is applied, the tendency is for the rubber rings to expand and spread away from the hub. The projections 15 tie into the rubber and thus hold each lamination in position and prevents this spreading action. Preferably the laminations fit snugly on to the hub.

Figure 5:
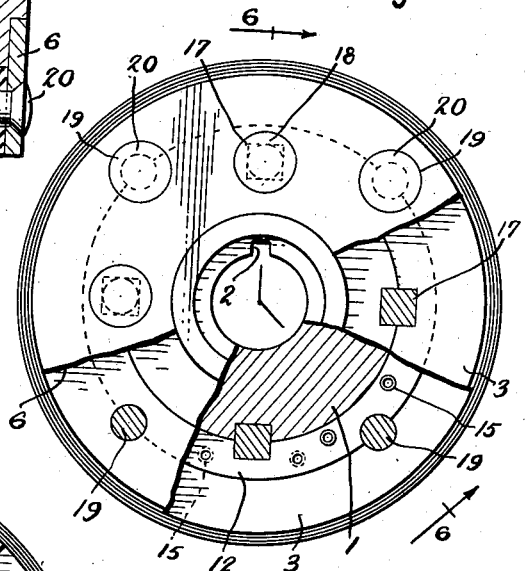
Fig. 5 is a view partly in end elevation and partly in section showing a modified form of the invention.

In the modified form shown in Figs. 5 and 6, the hub and laminations and tie rings bear the same reference characters, as well also as the end rings. In this form, which preferably applies to pulleys of larger diameter, keys or tie rods which are square in cross section are used, and these are illustrated at 17. The rings 12 and the laminations are cut out as shown in Fig. 6 to fit the square driving rods 17, and the ends of these rods may be riveted over as shown at 18. In addition to the keys or rods 17, other tie rods 19 are used, but these are disposed on a greater radius and are riveted over as illustrated at 20. In this case, due to the square formation of the rod 17, the tendency for the laminations to ride up over the rods is minimized and substantially eliminated. The rods 19 may be located on a radius suitable for the purpose and depending somewhat on the diameter of the pulley.

Figure 7:
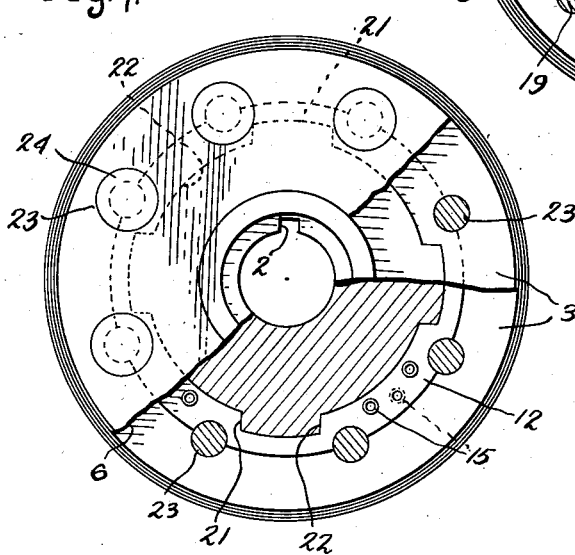
Fig. 7 is a view partly in end elevation and partly in section showing a still further modified form of the invention.

Instead of using separate rods for tying the laminations and rings in driving relationship with the hub, the hub may be formed with integral keys or ridges 21 separated by corresponding recesses 22, and the laminations of rubber and fabric and the tie rings 12 are fashioned to fit over the hub in driving relationship. In this form the tie rods are also used corresponding to the rods 7 and 19, and these are illustrated at 23 with their ends riveted over as at 24. These may be placed at any suitable radius and, as illustrated in Fig. 7, pass through the outer radius or circumference of the tie rings, the tie rings being grooved to receive the rods 23.

A pulley thus constructed has a certain softness or yield to the end that the lacings in the belt embed themselves somewhat in the pulley as they move over the pulley. The result of this is that there is hardly any wear on the lacings and a practically silent operation. Heretofore, with a pulley made of fibrous material or paper, there was a distinct audible noise each time the lacings moved over the pulley, and the arrangement was such that the lacings were rapidly worn out. Even though the lacings seem to embed themselves in the pulley somewhat, this appears to set up no appreciable wear on the pulley itself. Due to the high coefficient of friction which the pulley of this invention affords, a belt may be used which is looser than the present practice, and no resinous dressing or other dressing for establishing an increased coefficient of friction is needed. Due to the high coefficient of friction, short center to center couplings may be made without the use of an idler which serves to wrap the belt around one or both of the driving pulleys. The looseness which is permitted in a belt and the lack of wear on the lacings makes for a long life installation. The rubber which is used in the laminations is termed herein as live rubber. This is to distinguish from a hard rubber composition and is intended to describe a characteristic wherein the rubber has some yieldability and flowing characteristics; in other words, generally, the rubber is what may be termed "soft."

I claim:

1. A pulley for a flat driving belt comprising a hub, a plurality of separate rings of live rubber with fabric incorporated therein disposed over the hub, and a drive ring of smaller diameter than the rubber rings between each two adjacent rubber rings having a driving relation with the hub and having projecting means extending into the rubber rings.

2. A pulley for a flat driving belt comprising a hub, a plurality of rings of live rubber with fabric incorporated therein disposed over the hub in laminated form, and a metal ring between each two laminations and of smaller diameter than the laminations and having projecting means for extending into the laminations, and means for holding the laminations under axial pressure.

3. A pulley for a flat driving belt comprising a hub, a plurality of laminations of live rubber with fabric embedded therein disposed over the hub, a metallic ring of smaller diameter than the laminations between each two laminations having projections for extending into the laminations, and means for securing the rings in driving relation to the hub and for holding the laminations under axial pressure.

4. A pulley for a flat driving belt comprising a hub, a plurality of laminations of live rubber with fabric embedded therein disposed over the hub, a metallic ring between each two laminations having projections for extending into the laminations, and rods extending axially through the pulley for holding the laminations under axial pressure and for establishing a drive connection between the hub and the metal rings.

5. A pulley comprising a hub with axial grooves in its outer periphery, a plurality of rings of live rubber with fabric incorporated therein disposed over the hub, a metallic ring between each two laminations and having projecting means for biting into the laminations, said metallic rings and rubber rings having notches therein, and tie rods extending axially through the grooves in the hub and notches in the rings for establishing a driving connection between the hub and rubber and fabric rings and for holding the rubber and fabric rings under axial pressure.

6. A pulley comprising a hub, a plurality of laminations each comprising a rubber ring with fabric embedded therein placed over the hub, a metallic tie ring between laminations having projections for extending into the laminations, means for keying the tie rings to the hub, and other means extending through the laminations for holding the laminations under axial pressure.

7. A pulley comprising a hub, a plurality of laminations each comprising a rubber ring with fabric embedded therein placed over the hub, a metallic tie ring between laminations having projections for extending into the laminations, means for keying the tie rings to the hub, comprising square-like key members, and other means extending through the laminations for holding the laminations under axial pressure.

FREDERICK N. ROSS.